US007085366B2

United States Patent
O'Neil

(10) Patent No.: US 7,085,366 B2
(45) Date of Patent: *Aug. 1, 2006

(54) SYSTEM AND METHOD FOR TELEMARKETING THROUGH A HYPERTEXT NETWORK

(75) Inventor: Joseph Thomas O'Neil, New York City, NY (US)

(73) Assignee: AT&T Corp., New York, NY (US)

(*) Notice: Subject to any disclaimer, the term of this patent is extended or adjusted under 35 U.S.C. 154(b) by 156 days.

This patent is subject to a terminal disclaimer.

(21) Appl. No.: 10/666,238

(22) Filed: Sep. 18, 2003

(65) Prior Publication Data

US 2004/0062379 A1  Apr. 1, 2004

Related U.S. Application Data

(63) Continuation of application No. 09/679,553, filed on Oct. 6, 2000, now Pat. No. 6,711,256, which is a continuation of application No. 08/820,195, filed on Mar. 19, 1997, now Pat. No. 6,134,318.

(51) Int. Cl.
*H04M 3/00* (2006.01)
(52) U.S. Cl. ............... 379/265.01; 379/266.01
(58) Field of Classification Search ............ 379/265.01
See application file for complete search history.

(56) References Cited

U.S. PATENT DOCUMENTS

| | | | |
|---|---|---|---|
| 5,546,452 A | 8/1996 | Andrews et al. | |
| 5,710,887 A | 1/1998 | Chelliah et al. | |
| 5,793,861 A | 8/1998 | Haigh | |
| 5,848,143 A | 12/1998 | Andrews et al. | |
| 6,064,730 A * | 5/2000 | Ginsberg | 379/265.09 |

FOREIGN PATENT DOCUMENTS

| | | |
|---|---|---|
| EP | 0425161 A2 | 10/1990 |
| EP | 0425161 A3 | 10/1990 |
| EP | 0740445 A2 | 10/1996 |
| WO | WO 97/12448 | 4/1997 |

* cited by examiner

*Primary Examiner*—Creighton Smith

(57) ABSTRACT

A system and method for providing telemarketing services through a hypertext network that interconnects a telemarketing server system with a customer computer and an agent computer. The telemarketing server accepts a telemarketing request from the customer, and forwards the request to the agent if the agent is available, and to a queue if the agent is not available. When an agent receives a request, communications are either established between the customer and agent at once, or else scheduled for a later time. Telemarketing functions are implemented separately from media transport functions through a hypertext network such that the need for geographic centralization of telemarketing agents is eliminated.

23 Claims, 7 Drawing Sheets

SYSTEM AND METHOD FOR TELEMARKETING THROUGH A HYPERTEXT NETWORK

CLAIM OF PRIORITY

This application is a continuation application of U.S. patent application Ser. No. 09/679,553, filed Oct. 6, 2000, now U.S. Pat. No. 6,711,256 which is a continuation of U.S. patent application Ser. No. 08/820,195, filed Mar. 19, 1997, now U.S. Pat. No. 6,134,318.

FIELD OF THE INVENTION

This invention relates to telemarketing through a hypertext network, and particularly to a system and method for providing sales and product information services to prospective and actual customers through a hypertext network.

BACKGROUND OF THE INVENTION

Known telemarketing systems and methods operate utilize a telemarketing center (also called a "call center") to provide sales and product information to purchasers. The call center is a collection of marketing agents, supervisors, and telecommunications systems located in a single geographic location. The call center is generally connected to a network (such as the public switched telephone network) to which customers are connected. The telemarketing system implements telemarketing features (e.g., call routing) and telecommunications features (e.g., call center switch management) together.

A customer wishing to make a purchase is provided with a single telephone number, generally through advertisements. Upon dialing the number, the customer is connected to specialized telemarketing telecommunications equipment that has been specially configured to route the incoming call. Some systems are provided with an automated series of announcements that solicit additional information from the customer, which the customer provides by selecting options by pressing the appropriate button on his telephone touch pad. Other systems accept simple voice responses. This additional information is used by the telemarketing telecommunications equipment to decide how to route the call.

A call may be routed to an appropriate agent, to a queue if all appropriate agents are busy, or to a voicemail system on which the customer may leave a message. An appropriate agent is selected to receive an incoming call on any of a host of parameters, including particular agent skills, customer priority, customer responses to an automated inquiry system, time-of-day, and queue sizes.

Known systems are also able to initiate a call from an agent to a customer. This is commonly used in solicitations for bank credit cards, charitable contributions, and magazine subscriptions. The systems provide extensive call data recording, analysis, and reporting capabilities, as well as call-monitoring by supervisors. Call data may include such parameters as mean time spent per call, queuing delays, the number of incoming and/or outgoing calls, and agent workload.

These features are implemented using special software and hardware that is customized to accommodate the particular needs of each telemarketing call center. One vendor's hardware and software is rarely compatible with that of another. Thus, one vendor's component which may be best suited for a particular application may not operate with other call center components made by other vendors. The need to specially configure a substantial amount of software and hardware for each telemarketing center adds significantly to the cost of implementing known telemarketing systems.

Another disadvantage of known telemarketing systems in which the call is initiated by the customer is that the call is queued if all agents are busy. While the call is queued, the customer is on hold until one of the agents becomes available. The telemarketer or customer must pay for the connection and for any announcement provided to the waiting customer, in addition to any actual conversation time. It would be advantageous to delay establishing a connection at all until an agent is actually available.

Because known telemarketing systems implement telemarketing and telecommunications features together, such systems are usually large and complex. Telemarketing software must be customized and often comprises millions of lines of source code, and is expensive and time consuming to modify or enhance. Telemarketing hardware must be specially configured for each application, resulting in a hardware system that is inflexible and expensive to change. A better system would implement telemarketing functions separately from the underlying telecommunications functions. In that case, a required change in the telemarketing logic could be effectuated more easily because it would not directly involve the telecommunications control software. Further, the telemarketing functions would be portable among a variety of hardware platforms, which could be utilized to best and most economically support the objectives of the telemarketer.

It should further be noted that telemarketing functions supported by various call center vendors differ from vendor to vendor. Thus, a telemarketer with more than one call center may be unable to offer the same telemarketing functionality from one call center to anther, limiting the possibility of resource sharing. For example, is a first call center is exceptionally busy, it may not be possible to divert the overflow to a second call center because the second call center is implemented with products from another vendor, or else is implemented with products from the same vendor that are configured differently. This problem could also arise if the architectures of calling centers are different. For instance, a first call center with agents connected by local area network may not be easily reconfigured to handle calls normally taken by a second call center whose agents are connected directly to a call center switch on the premises. A better system would provide call center functionality regardless of the location and connectivity of diverse agent resources. This could be achieved by properly separating telemarketing functions from telecommunications functions.

Further, by separating telemarketing functionality from specific underlying telecommunications technology, telemarketing architects would be able to offer a uniform set of agent, customer, and supervisor interfaces that operate with switching equipment from multiple vendors which has been integrated to provide optimal telecommunications for the telemarketing application.

Implementing the customer interface through a hypertext network would be another improvement over known systems that require a customer to respond to a tedious set of questions by entering responses on the customer's telephone touch pad. Product information is also much more easily presented to the customer through a hypertext network, especially one which can handle multimedia information, including text, graphic, audio, video and animation media.

Known systems implement certain telemarketing functions through a hypertext network. However, these systems utilize the hypertext network only outside of the call center.

For example, in one known system, a customer requests a telephone connection to a sales agent at a traditional call center by selecting a feature on a hypertext page transmitted to the customer over the Internet. However, the architecture of the call center itself, with its centralized, customized hardware and software, remain the same as known systems. A better system would provide the advantages of hypertext networking to telemarketing, thus revolutionizing the call center by freeing it from having to exist at a single geographic location, profoundly reducing the necessity for custom-designed hardware and software, and providing the first truly portable telemarketing system that can operate easily from platform to platform and from network to network.

SUMMARY OF THE INVENTION

The present invention implements telemarketing functions over a hypertext network independently from media transport functions, resulting in more portable, flexible, and efficient telemarketing system than hitherto known. In accordance with the present invention, a telemarketing server system, agents, supervisors and customers are interconnected on a hypertext network. A hypertext network is a network capable of carrying hypertext information between nodes. An example of a hypertext network is the Internet, on which is implemented the World Wide Web, an interconnected set of geographically dispersed websites comprised of related hypertext files.

The telemarketing server system (TSS) comprises at least one computer that accepts and transmits hypertext information through the hypertext network. The. TSS accepts a request for telemarketing services from a customer. The customer makes the request generally by selecting an item on a hypertext page displayed to the customer through a browser.

Upon receiving the request, the TSS routes the request to an appropriate agent through the hypertext network if such an appropriate agent is available. Otherwise, the TSS routes the request to a queue, where it waits until an appropriate agent is available. The TSS assigns a priority to each request in a queue, and may assign each request to more than one queue. A request is routed to an agent from a queue in priority order when the agent becomes available.

When an agent becomes available, the agent may respond to the customer request immediately, or else carry out research or other activities and respond to the request at a later time. In one embodiment of the present invention, the agent responds to the customer request by placing a telephone call to the customer. In another embodiment, the customer is notified through the hypertext network that the agent is available an initiates a telephone call to the agent.

Each agent and customer has a telecommunications address that is used in establishing communications. This telecommunications address is a network address for a packet voice embodiment of the present invention, and a telephone number for an embodiment wherein communications are established over the public switched telephone network.

The scheduling of communications between the customer and agent is carried out in one embodiment by exchanges of messages between the customer and agent over the data network. In another embodiment, the scheduling is carried out using voicemail messages delivered over the public switched telephone network.

When a request is routed to an agent, the agent is provided with a hypertext agent page through the hypertext network. This agent page identifies the product in which the customer has expressed an interest. In one embodiment of the present invention, the agent page also comprises customer profile information, including the customer's credit rating, age, and buying patterns. The customer and agent exchange information over the public switched telephone network and/or over the hypertext network through customer hypertext pages that solicit customer information and provide further product information to the customer and/or through a regular telephonic or videotelephone connection. The agent completes an order through the agent page at the customer's request by which the product is purchased and sent to the customer.

The method of establishing communications between an agent and customer in accordance with the present invention is far more cost-effective and efficient than known systems because telecommunications resources are used only when both the customer and the agent are available. The present invention eliminates the costly process of placing a customer or agent on "hold" during a call while one or the other is busy, and advantageously provides the means for scheduling communications between customer and agent at a time of mutual convenience.

The TSS tracks the status of agents, queues, telemarketing requests and system performance in at least one database. Such information is available to a supervisor at the supervisor's request through the hypertext network. This information is presented to the supervisor as a supervisor hypertext page. In one embodiment, a supervisor makes manual adjustments to the system through the supervisor page. For example, the supervisor transfers a telemarketing request from one queue to another in a drag and drop operation.

The need to have agents and supervisors at a single geographic location is advantageously eliminated by the present invention by centralizing telemarketing control in the TSS and interconnecting the TSS, customers, agents and supervisors through a hypertext network. This introduces a new level of flexibility and efficiency in using human resources in low-cost areas to serve as agents and supervisors. Indeed, in one embodiment, the present invention enables an individual with nothing more than a personal computer, a browser, and a telephone to serve as an agent or supervisor, doing away with the expensive customized switches, special software, and office space required by known systems.

The present invention further reduces the complexity of telemarketing hardware and software. Software for the present invention only implements telemarketing functions, and can interface across various media transport hardware and software. Hence, it is smaller and easier to modify than known telemarketing software packages.

Further, commercially available, off-the-shelf software may be used to develop and maintain the software of the present invention because it is implemented on a hypertext network, for which an extensive and growing set of generic development tools and programs already exists. This is far less expensive and more flexible than the custom software development required by known systems.

The present invention provides a system and method for providing telemarketing services that is more portable over different transport media platforms, makes more efficient use of telecommunications resources, is easier and less expensive to develop, operate, maintain and modify than known systems. In accordance with the present invention, the customer is more effectively and efficiently provided with more capable telemarketing services.

DETAILED DESCRIPTION

The present invention provides a new and superior system and method for providing telemarketing services through a hypertext network. Telemarketing functions (e.g., call routing, providing a customer interface, etc.) are implemented separately from media transport functions (e.g., switching hardware and software for carrying communications.) This results in significant improvements in the cost, efficiency, and flexibility of providing telemarketing features that are more capable and easier to plan, develop, implement, operate and maintain than known systems. In accordance with the present invention, agents and supervisors need no longer be concentrated in a single location, but may function from anywhere while interconnected through a hypertext network.

A hypertext network is a network that carries hypertext data that is loaded and displayed as hypertext pages on connected computers using a browser. A well known hypertext network implemented on the Internet is the World Wide Web (WWW). The WWW comprises servers, computers connected to the Internet that host websites. A website is a logically related group of hypertext files. Each file has a Uniform Resource Locator (URL) that specifies its location.

The WWW further comprises client computers that operate software called browsers. A browser requests, loads and displays pages from websites at a user's request, or at the request of executable code on the client. This executable code may be stored on the client, or downloaded and executed along with a page from a website. Executable code that downloads with a page is often written in a programming language called Java script.

A substantial body of expertise, hardware and software has been developed to support hypertext applications, and is continuing to develop at a rapid pace. Existing tools can advantageously be used to inexpensively help develop, operate, maintain and update embodiments of the present invention, which thus requires less customized work than known telemarketing systems.

Figure 1:
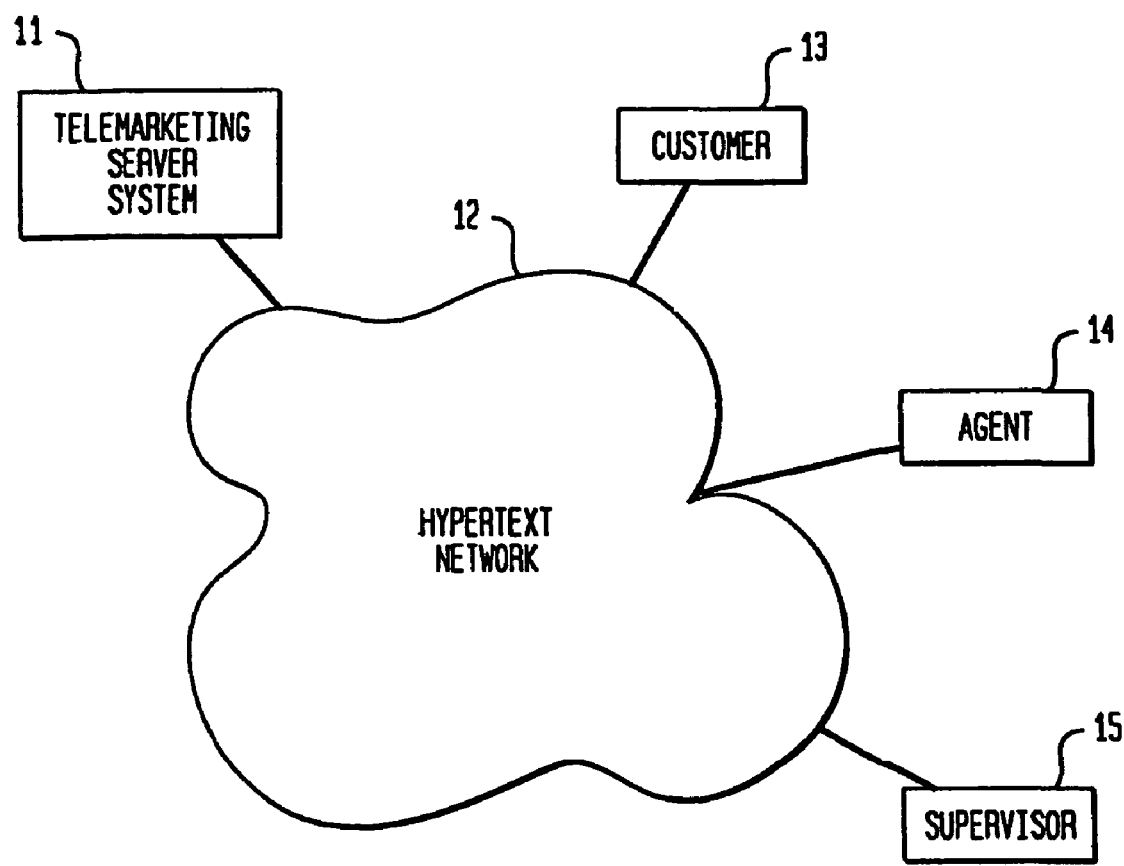
FIG. 1 shows an embodiment of the present invention.

In accordance with the present invention, telemarketing activities are controlled by a telemarketing server system 11 ("TSS") connected to a hypertext network 12, as shown in FIG. 1. The TSS 11 comprises a hypertext server computer that transmits pages through the hypertext network 12 to customer 13, agent 14, and supervisor 15 client computers connected to the network 12. in one embodiment, the TSS 11 is a workstation having httpd, hypertext server software that allows the TSS 11 to function as a website.

Media transport (e.g., telecommunications switching hardware and software) is handled separately from the present invention, which is advantageously able to operate across media transport hardware and software made by different vendors.

Figure 2:
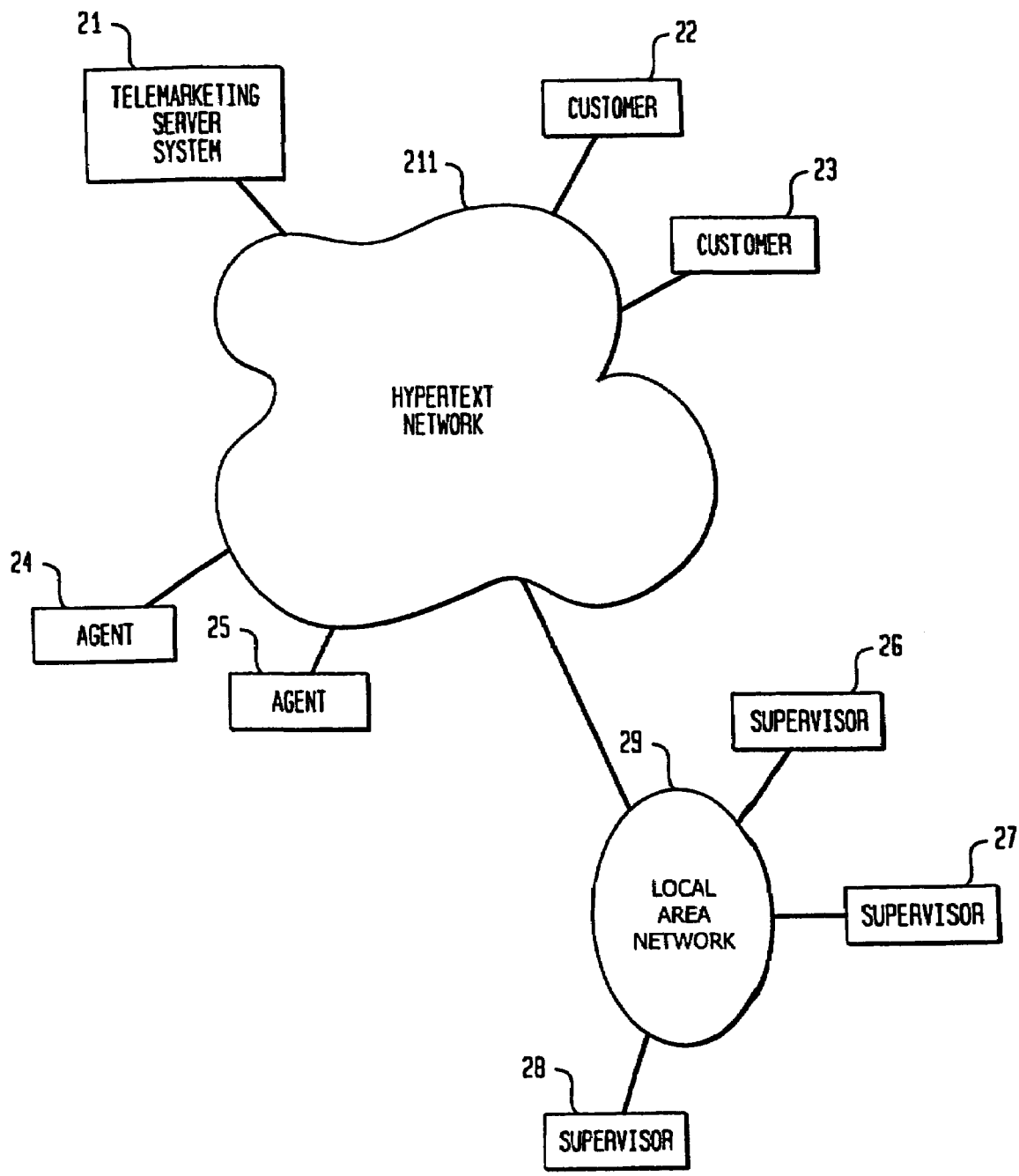
FIG. 2 shows another embodiment of the present invention wherein the supervisors are interconnected on a local area network.

In an embodiment shown in FIG. 2, the TSS 21 is connected to customers 22, 23 with personal computers operating the Microsoft Internet Explorer browser; to agents 24, 25 operating Sun Workstations; and to supervisors 26, 27, 28 operating personal computers interconnected on a local area network 29. One customer 22 is located in Spokane, Wash., and the other customer 23 is located in Columbus, Nebr. One agent 24 is located in Pittsford, N.Y., and the other agent 25 is located in Ocala, Fla. The supervisors 26, 27, 28 are located in the same building in Boulder, Colo. The TSS 21; the agents 24, 25; the customers 22, 23; and the supervisor local area network 29 are all interconnected through a hypertext network 211. In accordance with the present invention, this embodiment telemarkets with more flexibility and at lower cost than known call centers, where the agents and supervisors are co-located in the same geographical area.

The present invention may also be used for supervisors, agents or customers interconnected first through one or more local area, wide area, or hypertext networks that are eventually connected to a hypertext network to which the TSS is ultimately connected. Indeed, the TSS may comprise several computers either directly connected to a hypertext network, or else connected to such a network through another network, such as a local or wide area network.

Figure 3:
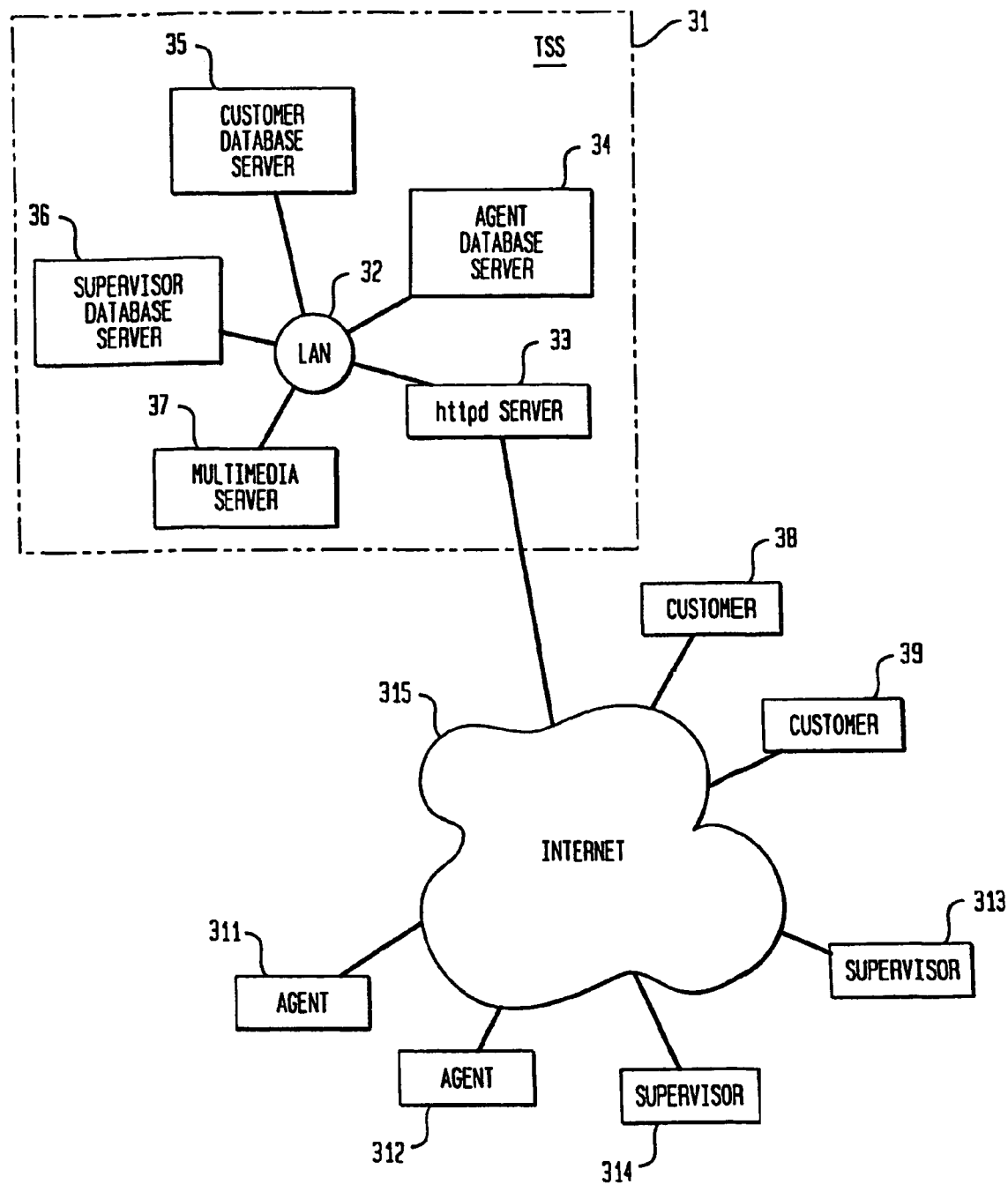
FIG. 3 shows an embodiment of the telemarketing server system in accordance with the present invention.

In one embodiment, the TSS is a single computer workstation. In another embodiment shown in FIG. 3, the TSS 31 comprises a set of specialized computers interconnected on a local area network 32. In this embodiment, the TSS 31 comprises a server 33 running httpd, which enables a server to provide a website on the WWW. The TSS 31 further comprises database servers 34, 35, 36 specially adapted to provide rapid access to various specialized databases concerning agents, customers, and supervisors, respectively. The TSS 31 further comprises a multimedia server 37 that is directed by the httpd server 33 to transmit multimedia video, audio and animation to a customer 38. The TSS 31 is connected to customers 38, 39; agents 311, 312; and supervisors 313, 314; through the Internet 315.

Figure 4:
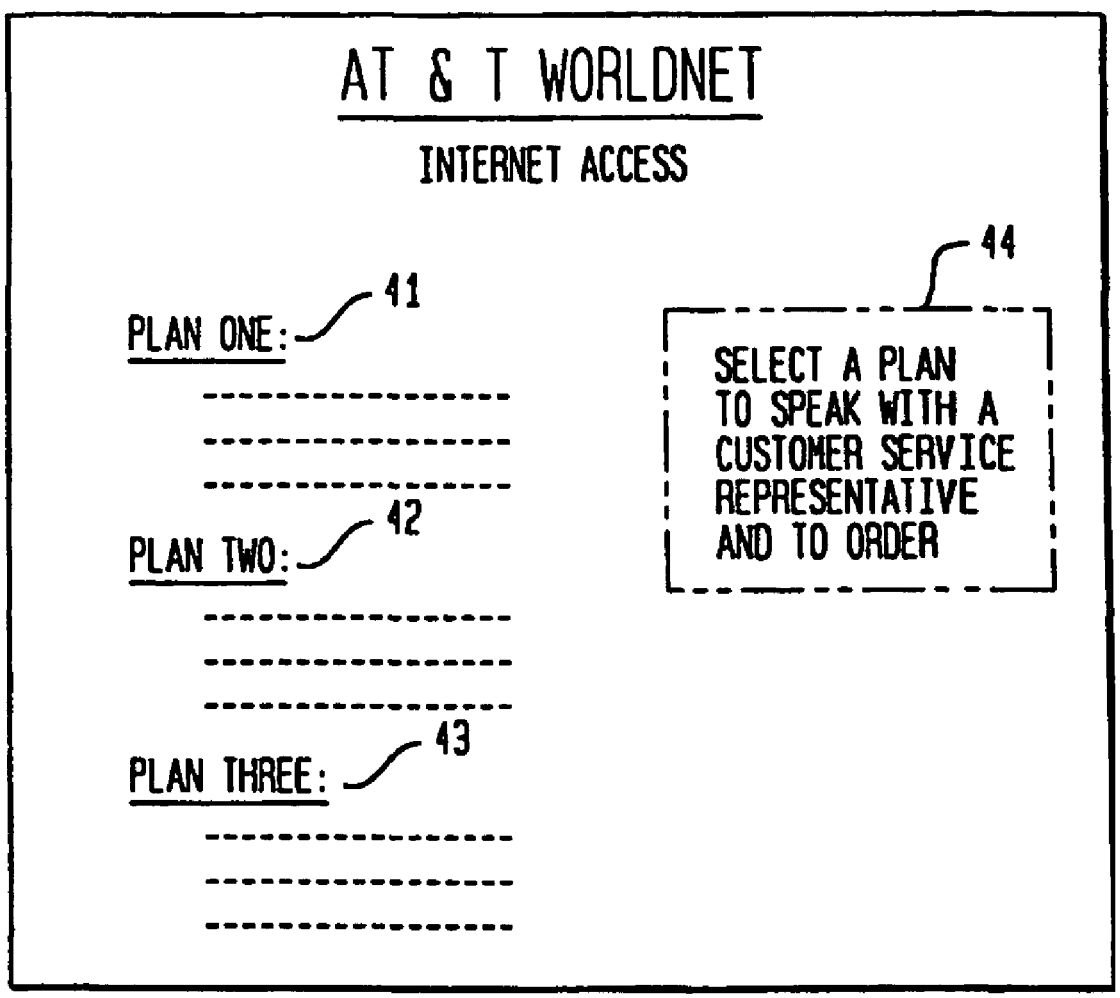
FIG. 4 shows an embodiment of a hypertext page by which a customer can access telemarketing services in accordance with the present invention.

At a customer's request, the TSS provides a page with telemarketing features to the customer. For example, a customer may request a page regarding AT&T WorldNet (sm) Internet access service. An example of such a page is shown in FIG. 4. The page displays information regarding various access plans 41, 42, 43, along with instructions 44 to select a plan to speak with a customer service representative and place an order.

When a customer selects Plan One 41, a call request message is forwarded from the customer computer to the TSS. In one embodiment, additional information is also transmitted to the TSS, including the customer computer's network address, customer identification data, and customer profile data. The customer's telecommunications address is also sent to the TSS. The customer telecommunications address may be a network address (e.g., for packet voice) or a telephone number (e.g., for the public switched telephone network) at which the customer may be reached in order to communicate with another party such as a sales agent.

When the TSS receives the call request, it routes the request to an appropriate agent, or, if an appropriate agent is not available, to at least one queue. This is accomplished by examining an agent database and a customer database maintained by the TSS. In one embodiment, the agent database comprises the agent name; agent logon user id and password; agent capabilities and areas of expertise; summary information regarding the status of the queue containing calls for the agent; and workload distribution (agent performance statistics). In one embodiment, the customer database comprises information including the customer's name; address, age; income range; and buying patterns. The TSS decides how to route the call based upon criteria founded on such information in accordance with methods that are well known in the art.

If no appropriate agent is available, the TSS sends the call to at least one queue, and assigns a relative priority to the call within each queue. "Priority queuing" may be determined in accordance with techniques from known telemarketing systems. The TSS considers agent and customer data in routing a call to a queue, and also considers queue information by consulting the current state of each queue and historical queue information stored in a queue database.

When the TSS routes a call to an available agent, the TSS sends a message to the agent computer that causes information pertinent to the call to be displayed to the agent. An embodiment of an agent page is shown in FIG. 5.

Figure 5:
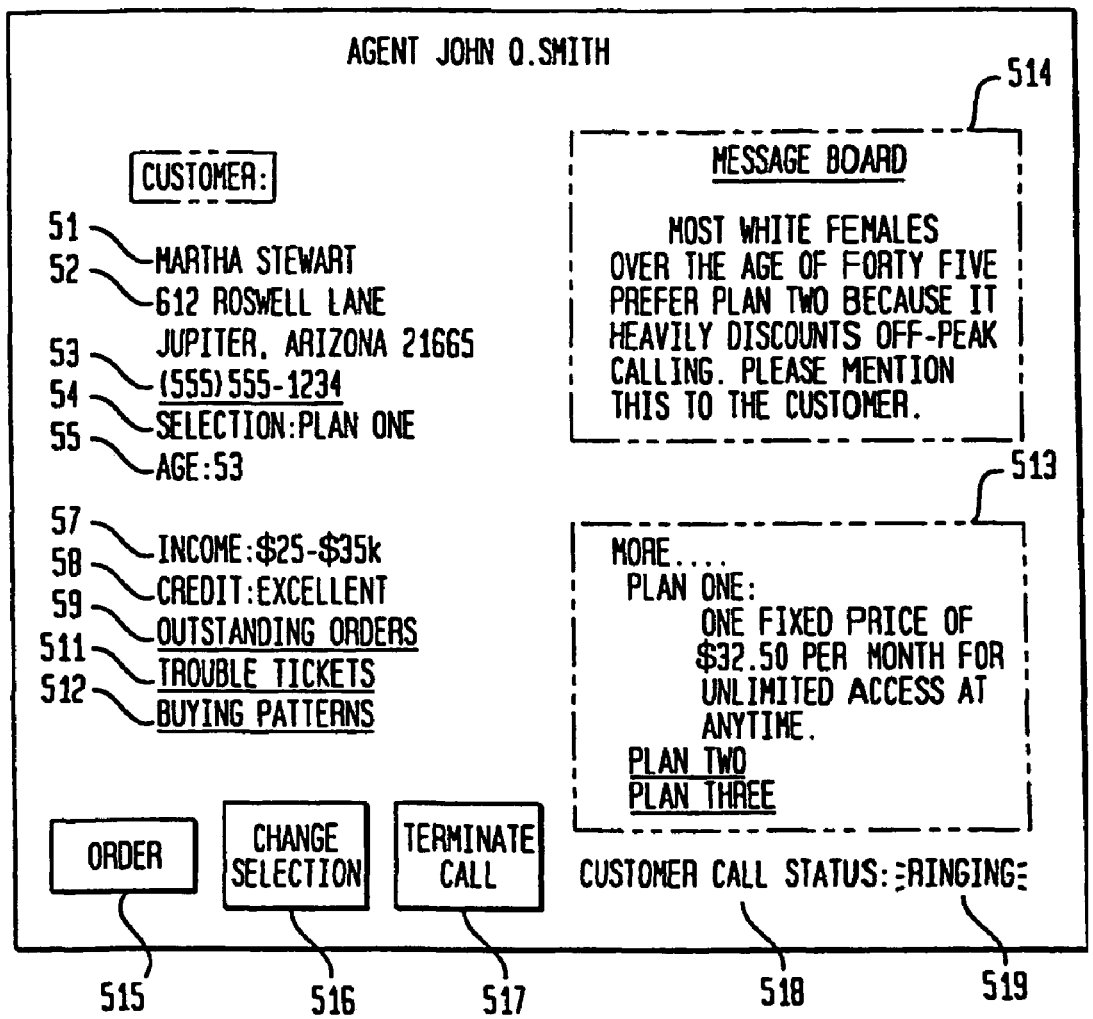
FIG. 5 shows an embodiment of a hypertext page displayed to an agent in accordance with the present invention.

As shown in FIG. 5, customer information transmitted from the TSS is displayed to the agent. In this embodiment, customer information includes the customer name 51, address 52, telephone number 53, product selection 54, age 55, income 57 and credit rating 58. Underlined items may be selected by the agent for further action or information. For example, if the agent selects "plan one" 54, additional data regarding plan one appears on screen. This additional data may comprise further hypertext links, which may advantageously be selected in accordance with the present informational needs of the agents. The additional information provided need not displace information presently displayed on the agent screen. In one embodiment, the additional information appears in the box labeled "More . . . " 513

Underlined items that may be selected include customer information on outstanding orders 59, trouble tickets 511 and buying patterns 512.

The TSS may also display further instructions to the agent based upon the customer selection and the customer profile. In the embodiment shown in FIG. 5, the TSS has instructed the agent to suggest an alternative product based upon the demographic group to which the customer belongs in an area designated "Message Board" 514. This area need not be a permanent fixture on the agent page, even in this embodiment. One of the principal advantages of implementing telemarketing functions in accordance with the present invention is that a user page can be dynamically configured to optimally present necessary information. Thus, if the TSS had no message for the agent, the Message Board 514 would not appear, and the area on the screen occupied by the Message Board 514 in FIG. 5 would be occupied by other pertinent information.

The present invention advantageously provides the capability of the agent and customer to schedule communications at a time of mutual convenience. In one embodiment, the scheduling of communications is carried out using messages sent between the customer and agent over a data network. In another embodiment, scheduling is carried out by exchanging voicemail messages over the public switched telephone network (PSTN). At the scheduled time, communications are established between the customer and agent.

In one embodiment, the agent uses the customer telecommunications address to establish communications with the customer. In this embodiment, the customer telecommunications address is the customer network address, and the agent initiates a call to the customer using packet voice technology through the hypertext network. In another embodiment, the agent initiates a telephone call using the customer telephone number, conveyed as the customer telecommunications address. Thereafter, the customer and the agent communicate.

In yet another embodiment, the customer is notified through the hypertext network when an agent becomes available. At that time, the customer initiates communications over the data network or the PSTN. Likewise, the customer may initiate communications at a scheduled time for such communications.

In the event the customer confirms her desire to order her selected product, the agent selects the order button 515. If the customer decides she wants to order another product, the agent may change the selected product by selecting the change selection button 516. At that time, the agent will be provided with a list of other products from which to choose, and then order. If the customer does not wish to complete an order, the agent selects the terminate call button 517. Likewise, after an order is placed and the customer is finished, the agent selects the terminate call button 517. At that time, the call is terminated and a message is sent to the TSS indicating the agent's availability. The TSS updates the agent database accordingly.

In this embodiment, the agent page displays the current status of the call between the agent and the customer after the words "customer call status" 518. The status presently displayed in FIG. 5 is "ringing" 519. Other states include "connected" and "dropped." A call is dropped when either the customer or the agent terminates the call.

In another embodiment of the present invention, the customer initiates a call to the agent. When a call request is received by the TSS, the TSS selects an agent to handle the call and sends a call request message to an agent. In one embodiment, this message comprises a request to the customer to initiate a call to the agent immediately. In another embodiment, the message comprises a request to the customer to call the agent at a predetermined time, e.g., "Please call agent Smithers at extension 282 at 4:00 P.M. EST today." The TSS then sends a message to the customer along with the agent telecommunications address. The customer initiates a call to an agent by selecting an area on the customer's screen. The customer does so, and the agent answers the call, and the customer and agent communicate. When the call is answered, the agent sends a status message to the TSS, which updates the agent database.

Figure 6:
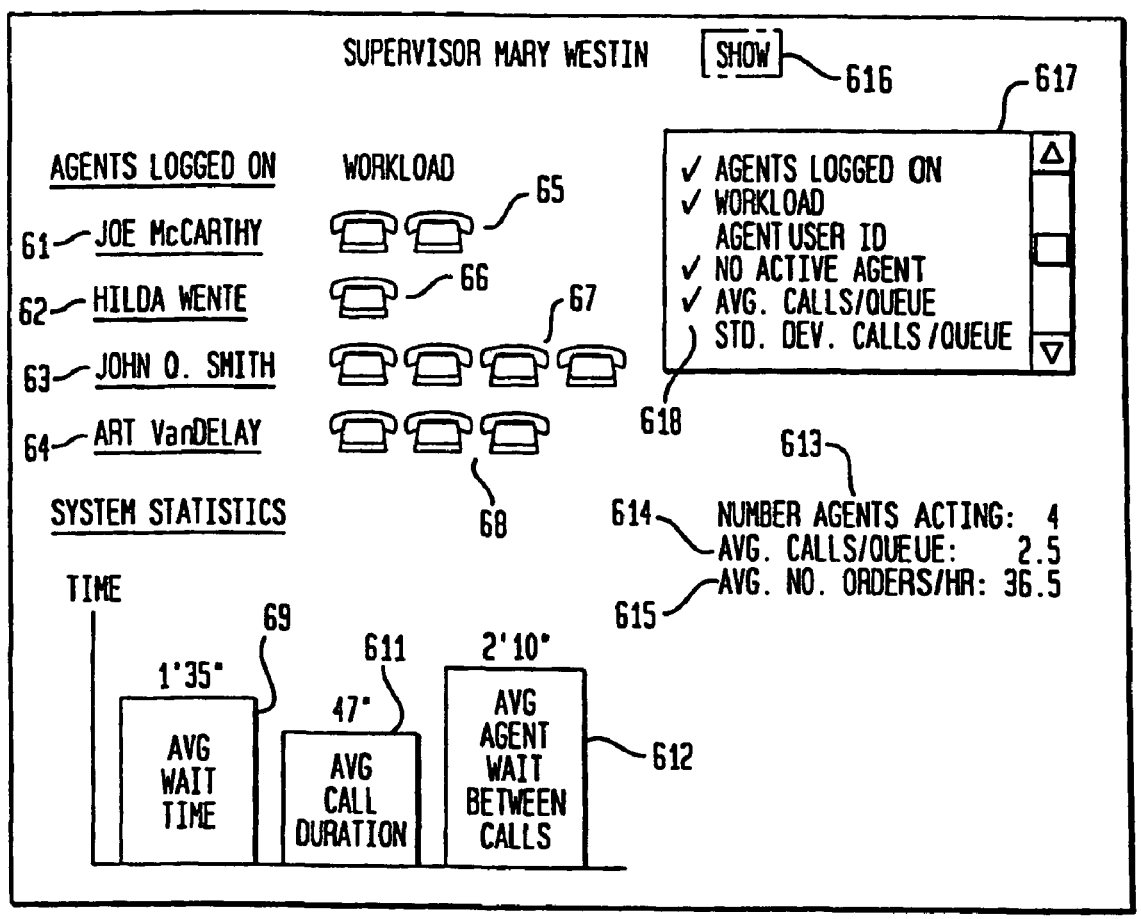
FIG. 6 shows an embodiment of a hypertext page displayed to an agent in accordance with the present invention.

The TSS also provides a page to a supervisor. An embodiment of a supervisor page is shown in FIG. 6. The supervisor accesses the page by requesting it from the TSS. In one embodiment the TSS displays a supervisor page only if it is requested from a network address already in a supervisor database. The supervisor logs on by typing a user id and a password and sending it to the TSS. If the user id and password match those in the supervisor database, the supervisor is logged on and the TSS updates the status of the supervisor in the supervisor database.

The supervisor page provides the supervisor with real-time and historical data about the telemarketing system. The page lists the names of each active agent 61, 62, 63, 64. When an agent's name 61 is selected by a supervisor, the supervisor is provided with the agent's profile, taken from the agent database. In one embodiment, the agent profile comprises the agent's name, age, years of experience, areas of expertise, customer satisfaction rate, and efficiency rating (e.g., average number of calls handled per hour).

Following each agent is a graphical depiction of the agent's workload 65, 66, 67, 68. Each telephone graphic 66 is equivalent to a call in the agent's queue. When an agent is on a call, the nearest telephone to the agent's name changes color. When the agent terminates a call, the telephone graphic for that call in the queue (the one nearest to the agent's name) disappears, and the rest of the graphics shift to the left.

When the supervisor selects a telephone graphic 66, the customer profile for that call appears to the supervisor. In one embodiment, this profile comprises the elements discussed for the customer profile above. Based upon the customer profile, the agent profile, and the agent workloads, the supervisor may manually adjust the queuing generated by the TSS by selecting a telephone graphic 66 and dragging it any position in any other queue. In this way, the supervisor may dynamically and advantageously fine tune the operation of the telemarketing system.

The supervisor is also provided with system-wide real-time statistics, such as the average wait time for a caller 69, the average call duration 611, and the average wait for the system between calls 612. The system also displays the number of active agents 613, the average number of calls per queue 614 and the average number of orders placed per hour 615. These statistics offer the supervisor the means to judge overall system business, efficiency, and quality of operation. These statistics are periodically updated by the TSS, which sends update messages to the supervisor. Based on this information, the supervisor can efficiently and accurately manage system resources, e.g., decide whether to request additional agents to log on, or ask one or more agents to logoff.

At least part of the information displayed to the supervisor is advantageously selectable by the supervisor in accordance with the present invention. In this way, the supervisor can tailor her screen to present the most useful information suitable for the supervisor's specific task. This is carried out in one embodiment when the supervisor selects the show button 616. A window 617 appears with a list of displayable information. The supervisor proceeds down the list, and selects those items she wishes to see displayed. When she selects an item, a check mark 618 appears next to it to show that it has been selected. A selected, checked item is de-selected by selecting it again, at which time the check mark disappears. In this way, the display selection function acts as a toggle. When any area of the screen is selected out of the displayable information window 617, the window 617 conveniently disappears.

In one embodiment, the TSS manages telemarketing activities through the use of threads. A thread is a sequence of execution within an executing software process, and is analogous to an object-oriented subroutine with a carefully defined interface to the rest of an executing program. When a thread is initiated, it begins to execute, pauses when it needs additional input to proceed, and terminates when it completes its function. This is a more efficient method of managing telemarketing operations than initiating a separate executing software process for each call; for example. Further, certain programming languages and execution environments are able to efficiently timeslice processor time among threads that are ready to execute, improving system execution times and reducing latency and wait times.

In one embodiment, a separate thread exists for each agent, call, queue and supervisor. Further, there is one router thread and one report generator thread. The agent thread maintains agent status information by handling messages regarding agent status to the TSS, which uses the information in the message to update the agent database. The status of an agent comprises the states of being logged off; logged on and awaiting call; ringing; talking; or after-call work. The agent thread manages transitions between these states and tracks the times at which these transitions occur. These times are recorded in the agent database. The thread calculates summary statistics such as the number of calls handled by an agent in a given session; the average time spent per call; the average time spent logged into the system; the average time a call is placed on hold; the average time for after-call work; and the percentage of time spent handling a call. The agent thread can supply this information on request so that real time reports about agent status may be generated. Further, this information is written to the agent database for the generation of historical reports.

Pseudo-code for an embodiment of an agent thread is:

```
1. for(;;) {
2.     receive message
3.     switch(type of message) {
4.     case agent_login:
5.         agent_login( );
6.         break;
7.     case agent_answers_call:
8.         agent_answers_call( );
9.         break;
10.    case agent_drops_call:
11.        agent_drops call( );
12.        break;
13.    case agent_transfers_call:
14.        agent_transfers_call( );
15.        break;
16.    case agent_requests_conference:
17.        agent_requests_conference( );
18.        break:
19.    case agent_completes_after_call_work:
20.        agent_completes_after_call_work( );
21.        break;
22.    case agent_logoff:
23.        agent_logoff( );
24.        break;
25.    case supervisor_requests_status:
26.        supervisor_requests_status( );
27.        break;
28.    }
29. }
```

When an agent terminates a call, the call thread is notified, and the agent status is updated from the "talking" state to the "agent logged in and awaiting call" state:

```
1. agent_drops call_( ) {
2.     change state;
3.     forward this message to the appropriate call thread;
4.     if(agent is now in "awaiting call"state) {
5.         get a queued call from router Compromise
6.     }
```

The transition between the completion of after-call work and the "agent logged on and awaiting call" state is handled similarly:

```
1.agent_completes_after_call-work( ) {
2.      change state to 'awaiting call';
3.      get a queued call from the routine thread;
4.}
```

A call thread is initiated when a call is initiated, and terminates when the call terminates. It maintains such information as the customer and agent name, and selects a queue in which to place the call if an agent is unavailable to handle the call. It tracks which queues in which the call currently exists. A call may exist in several different queues at once, and have a different priority in each queue. At the appropriate time (i.e., when a call is handled by an agent or the call is dropped), the call thread removes the call from all other queues. The call thread manages the transitions among these states and tracks the time at which significant state transitions occur. This enables it to calculate important statistics about the call, particularly any queuing delays experienced by customers.

The call thread can supply this information on request for real-time reports, and writes this information to a queue database for historical report generation.

An embodiment of pseudo-code for a call thread is:

```
1.for(;;) {
2.      receive message
3.      switch(type of message) {
4       case client_requests_service:
5.          client_requests_service( );
6.          break;
7.      case client_drops_call:
8.          client_drops_call( );
9.          break;
10.     case agent_answers_call( );
11.         agent_answers_call( );
12.         break;
13.     case agent_drops_call:
14.         agent_drops_call( );
15.         break;
16.     case agent_transfers_call:
17.         agent_transfers_call( );
18.         break;
19.     case agent_requests_conference:
20.         agent_requests_conference( );
21.         break;
22.     case supervisor_requests_status( );
23.         supervisor_requests_status( );
24.         break;
25.     }
26.}
```

When a customer call request initiates a call thread, the customer profile is retrieved from the customer database. The router thread is asked by the call thread to select an agent for the call. The router thread carries this out by applying routing criteria to the customer profile and the agent profile, which the router thread retrieves from the agent database. If an agent is not available to handle the call, the call request is queued in at least one queue, and a priority is assigned to the call in each queue. If an agent is available to handle the call, then the appropriate information is sent to the customer computer (e.g., an indication that the call is being established) and the agent computer (customer profile, product selected, etc.). An embodiment of pseudo-code for implementing this process is:

```
1.client_requests_service( ) {
2.      client_profile -
retrieve_client_profile_from_database( );
3.      agent_id -
ask_router_thread_to_select_agent( );
4.      if(agent_id -- null) {
5.          queue_client_request( );
6.      } else {
7.          send_information_to_agent( );
8.          send_information_to_client( );
9.          if(agent should I initiate call) {
10.             tell_agent_to_dial_client( );
11.         } else {
12.             tell_client_to_dial_agent( );
13.         }
14.     }
15.}
```

If the customer drops the call while it has been queued, it must be removed from the queues by the call thread. If the call is dropped by the customer while it is being handled by an agent, the agent thread is instructed to drop the call. Pertinent information about this state change is written to a database, where it can be used for historical report generation. The call thread is then terminated. An embodiment of this transition implemented in pseudo-code is:

```
1.client_drops_call( ) {
2.      if(call is currently queued) {
3.          remove the call from all queues;
4.      }else{
5.          drop all other parties from the call:
6.      }
7.      record summary data for this call in a
database;
8.      terminate the call thread;
9.}
```

If the agent drops the call, the customer is told to drop the call by the call thread before the call thread terminates. Information regarding the transition is written to a database for historical report generation:

```
1.agent_drops_call( ){
2.      update status information for the call;
3.      if(only the client remains on the call) {
4.          tell client to crop;
5.          write call summary information to
database;
6.          terminate the call thread;
7.      }
8.}
```

A queue thread manages the data structures used to record which calls are currently in the queue and the relative priorities of those calls. A call is removed from a queue thread when the call is dropped or routed to an agent. The queue thread periodically writes summary queue information to a queue database so that historical reports about queue performance can be produced by the report generator thread. The queue thread also responds to inquiries from a supervisor thread, providing queue information for real-time reports that are presented to a supervisor.

When a call request is received, a call thread requests the router thread to handle its call. The router thread selects an agent to handle an inbound call request by consulting the customer and agent profiles. If no agent is currently available to handle the call, the call can be entered into one or more queues at different priorities. If an agent is currently available, the router thread routes the call to the agent by adding the agent to the call thread.

When an agent becomes available to handle another call (either by logging in to the system or completing a current call), the router thread examines the queued calls to find a best match. The router thread then adds the agent to the call thread.

An embodiment of pseudo-code for the router thread is:

```
1.for(;;) {
2.      receive message;
3.      switch(type of message) {
4.      case select_agent:
5.          choose an agent to handle this inbound call;
6.          break;
7.      case select_call:
8.          choose a call for this agent;
9           break;
10.     }
11.}
```

A supervisor thread produces real-time and historical system reports by retrieving information from various databases, including the agent database, the supervisor database, the queuing database, and so on. The supervisor thread also retrieves information from call and agent threads to produce real-time reports to display to the supervisor. An embodiment of pseudo-code for a supervisor thread is:

```
1.for(;;) {
2.      receive message
3.      switch(type of message) {
4.      case supervisor_login( );
5.          supervisor_login( );
6.          break:
7.      case supervisor_report:
8.          supervisor report( );
9.          break;
10.     case supervisor_logoff:
11.         supervisor_logoff(_;
12.         break;
13.     }
14.}
```

The report generator thread processes summary information written to databases from the agent, call, queue and router threads and produces reports. These reports provide overall operations statistics on the telemarketing system, and may be used by managers of the system to make architectural, operational, or planning changes to the system.

Figure 7:
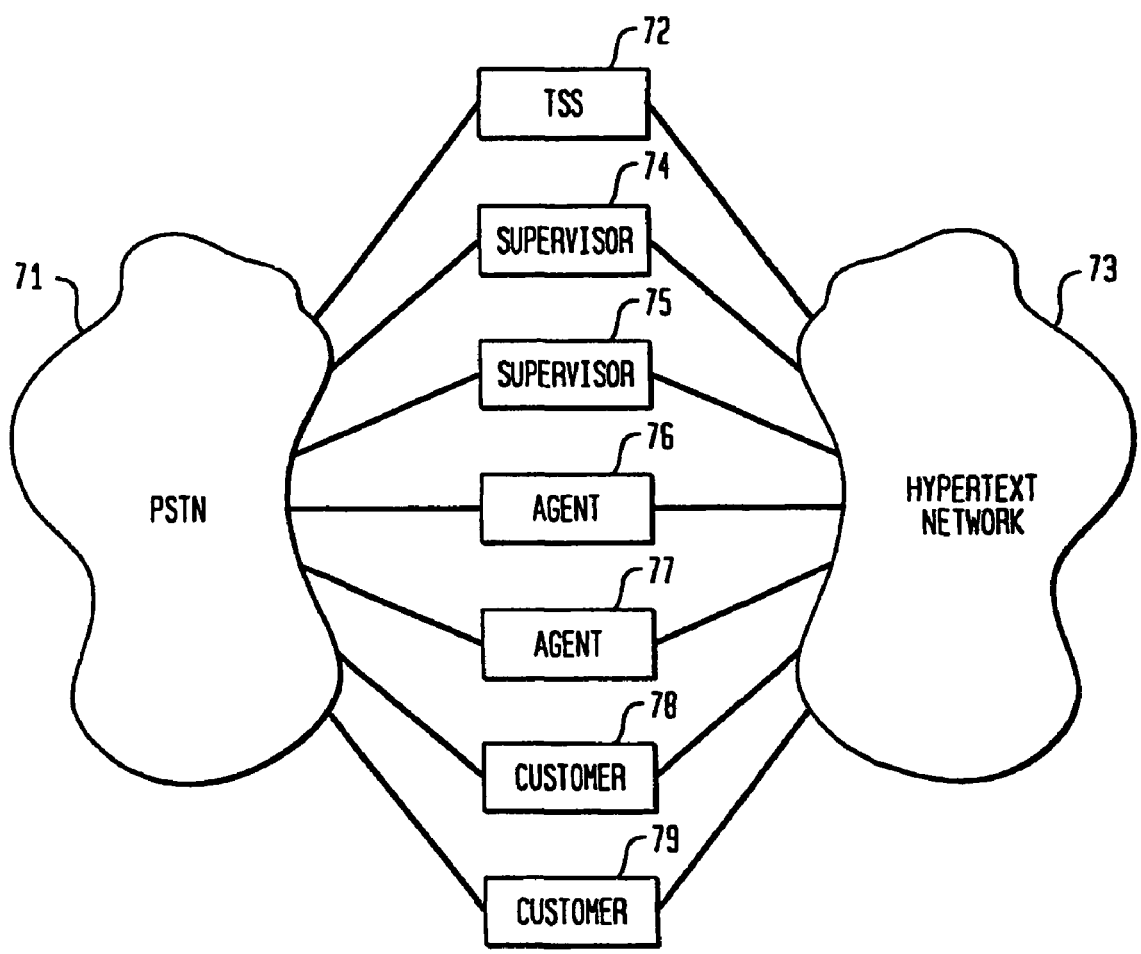
FIG. 7 shows an embodiment of the present invention wherein the telemarketing server system establishes communications between agents and customers through the public switched telephone network in accordance with the present invention.

In another embodiment, the present invention interfaces with the Public Switched Telephone Network (PSTN) 71 to establish multimedia communications between the customer and agent, and the agent and supervisor. This system, shown in FIG. 7, is advantageous because it does not require packet voice technology to carry multimedia communications between the parties. In this context, multimedia communications includes at least one of voice, video, graphic, text, and animation media. A typical application for which the PSTN 71 is used would be telephone communications. Another application would be video telephone communications.

In this embodiment, the TSS 72 acts as a bridge between the hypertext network 73 and the PSTN 71. The TSS 72; supervisors 74, 75; agents 76, 77; and customers 78, 79 are connected to both the hypertext network 73 and the PSTN 71. Each party has a telecommunications address, which in this embodiment is each party's telephone number. These telecommunications addresses are provided by the parties to the TSS 72.

When a customer 78 requests communications with an agent 77, the TSS 72 calls the agent 77 on the PSTN 71, then the TSS 72 calls the customer 78 on the PSTN 71, and then the TSS 72 bridges the two calls so that the customer 78 and the agent 77 can communicate over the PSTN 71. A suitable system and method for carrying out these features is disclosed in U.S. patent application Ser. No. 10/057,717, System and Method for Providing Telephonic Connection Services Using a Data Network, filed concurrently herewith, the disclosure of which is hereby incorporated by reference. Multimedia communications between an agent and a supervisor may be established in the same way. Similarly, a teleconference between a customer, an agent and a supervisor may be established by having the TSS call the customer, agent and supervisor separately on the PSTN, and then bridge the calls into a teleconference over the PSTN.

Once communication is established between the customer 78 and agent 77 on the PSTN, the telemarketing system may proceed as previously described. The call request from the customer 78 still prompts the TSS to send customer and product information to the agent 77, as is exemplified in FIG. 5.

The present invention provides a system and method for conducting telemarketing activities in a distributed system where the agents and supervisors need not be located or co-located in the same place. Rather, like the customers, they need only be interconnected with a hypertext network that is provided with the present invention. Telemarketing functionality is implemented separately from the media transport function, making changes to telemarketing features much less complex; easier to plan, implement and maintain; and less expensive than known systems. This is because in accordance with the present invention, changes to the telemarketing system can be made without necessarily making any changes to the underlying switching hardware and software. Thus, the present invention is advantageously portable, as it may be used without modification across switching platforms made by different vendors. The present invention makes more efficient use of telecommunications resources, only establishing telecommunications connections when an agent is available for handling a customer, hence avoiding placing the customer on hold while he awaits service from an agent. Finally, implementing telemarketing in a way that takes full advantage of the capabilities of a hypertext network makes available standard, off-the-shelf hypertext network development tools and products for producing more capable telemarketing systems more quickly and less expensively than ever before.

What is claimed is:

1. A telemarketing system on the Internet comprising:
 a. an agent client coupled to the Internet;
 b. a telemarketing server system coupled to the Internet, said telemarketing server system obtaining a telemarketing request from a customer through the Internet, and routing said telemarketing request through the Internet to said agent client if an appropriate agent is available, and to a queue if an appropriate agent is not available; and c. a supervisor client coupled to the Internet, said telemarketing server system sending telemarketing system information to said supervisor client, said supervisor client comprising a supervisor page for permitting manual adjustment of the queue based at least in part on the telemarketing system information;

d. wherein said supervisor page contains a list of each active agent, and further provides access to each active agent's profile.

2. The telemarketing system of claim 1, wherein said manual adjustment of the queue is permitted through the Internet.

3. The telemarketing system of claim 1, wherein said telemarketing system information is sent to said supervisor client through the Internet.

4. The telemarketing system of claim 1, wherein said supervisor page displays a workload of each active agent.

5. The telemarketing system of claim 4, wherein said supervisor page further provides access to call profiles of calls in an agent's workload.

6. The telemarketing system of claim 4, wherein the workload display for each agent is a plurality of icons corresponding to queued and active calls, said icons being selectable for displaying information about the corresponding call.

7. The telemarketing system of claim 6, said icons further being moveable to reassign a corresponding call to another agent.

8. The telemarketing system of claim 1, wherein the telemarketing system information comprises historical and real-time information.

9. A method for providing telemarketing services through the Internet, comprising the steps of:

receiving a telemarketing request from a customer through the Internet;

forwarding said telemarketing request through the Internet to an agent client if an appropriate agent is available, and to a queue if an appropriate agent is not available; and sending telemarketing system information to a supervisor client, said supervisor client comprising a supervisor page for permitting manual adjustment of the queue based at least in part on telemarketing system information;

wherein said supervisor page contains a list of each active agent, and further provides access to each active agent's profile.

10. The method of claim 9, wherein said manual adjustment of the queue is permitted through the Internet.

11. The method of claim 9, wherein said telemarketing system information is sent to said supervisor client through the Internet.

12. The method of claim 9, wherein said supervisor page displays a workload of each active agent.

13. The method of claim 12, wherein said supervisor page further provides access to call profiles of calls in an agent's workload.

14. The method of claim 12, wherein the workload display for each agent is a plurality of icons corresponding to queued and active calls, said icons being selectable for displaying information about the corresponding call.

15. The method of claim 14, said icons further being moveable to reassign a corresponding call to another agent.

16. The method of claim 9, wherein the telemarketing system information comprises historical and real-time information.

17. A method for providing telemarketing services through the Internet, comprising the steps of:

receiving a request for telemarketing service through the Internet from a customer;

forwarding said request through the Internet to an appropriate agent if the appropriate agent is available, and to a queue if the appropriate agent is not available;

facilitating the establishment of communications between the agent and the customer; and reporting telemarketing system performance information and agent profile information to a supervisor through the Internet.

18. The method of claim 17, wherein said telemarketing system performance information is reported to the supervisor through the Internet.

19. The method of claim 17, further comprising the step of providing customer information to the supervisor about customers in a queue for said agent.

20. A system for providing telemarketing services through an Internet interconnecting agents and customers, comprising:

means for receiving a telemarketing request from a customer;

means for forwarding said telemarketing request through the Internet to an appropriate agent if said appropriate agent is available, and to a queue if said appropriate agent is not available;

means for establishing communications between said customer and said agent; and means for reporting information about the performance of said system and agent profile information to a supervisor through the Internet.

21. The system of claim 20, further comprising means for providing customer information to the supervisor about customers in a queue for said agent.

22. A computer-readable medium storing instructions that, when executed by one or more processors, cause the one or more processors to perform activities comprising:

receiving a request for telemarketing service through the Internet from a customer;

forwarding said request through the Internet to an appropriate agent if the appropriate agent is available, and to a queue if the appropriate agent is not available;

facilitating the establishment of communications between the agent and the customer; and reporting telemarketing system performance information and agent profile information to a supervisor through the Internet.

23. The system of claim 22, wherein the activities furthermore comprise providing customer information to the supervisor about customers in a queue for said agent.

* * * * *